United States Patent
Bandopadhyay

(10) Patent No.: US 9,608,867 B1
(45) Date of Patent: *Mar. 28, 2017

(54) DETECTING DEVIATION OF DATA CENTER CONNECTIVITY BY CONDITIONAL SUB-GRAPH MATCHING

(71) Applicant: Symantec Corporation, Mountain View, CA (US)

(72) Inventor: Tushar Bandopadhyay, San Jose, CA (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,321

(22) Filed: Jan. 4, 2016

Related U.S. Application Data

(63) Continuation of application No. 14/143,669, filed on Dec. 30, 2013, now Pat. No. 9,231,833.

(51) Int. Cl.
*H04L 12/28* (2006.01)
*H04L 12/24* (2006.01)

(52) U.S. Cl.
CPC ................ *H04L 41/12* (2013.01)

(58) Field of Classification Search
CPC ...................................... H04L 41/12
See application file for complete search history.

(56) References Cited

U.S. PATENT DOCUMENTS

| | | | |
|---|---|---|---|
| 9,231,833 B1* | 1/2016 | Bandopadhyay | H04L 41/12 |
| 2005/0198244 A1* | 9/2005 | Eilam | G06F 9/5061 |
| | | | 709/223 |
| 2012/0151026 A1* | 6/2012 | Chen | H04L 41/12 |
| | | | 709/223 |
| 2014/0310559 A1* | 10/2014 | Deng | G06F 11/008 |
| | | | 714/37 |
| 2015/0049634 A1* | 2/2015 | Levchuk | H04L 41/14 |
| | | | 370/254 |

OTHER PUBLICATIONS

Toru Mano et al. (IEEE, May 27-31, 2013, "secure resource Provisioning Across Multiple domains", pp. 1129-1134).*

* cited by examiner

*Primary Examiner* — Maharishi Khirodhar
(74) *Attorney, Agent, or Firm* — Campbell Stephenson LLP

(57) ABSTRACT

Various systems and methods for detecting a deviation of an existing connectivity of a data center from a pre-determined connectivity are presented. One method involves detecting a deviation of an existing connectivity of a data center from a pre-determined connectivity by defining a start node. The start node is defined based on a condition of a component of the data center. The condition is determined based on an explicit relationship between a node and another node of the data center. The method involves conditionally matching a sub-graph and a portion of a main graph by identifying the deviation. The conditional matching is begun at the start node. A failure to conditionally match a portion of the sub-graph and a portion of the main-graph indicates that the deviation exists.

20 Claims, 10 Drawing Sheets

| Condition 402 | Scenario 404 | Output 406 |
|---|---|---|
| GAP#1, Condition 402(1): DB Backup Policy for X should have "Platinum" data class | 1 "Good" Backup<br><br>1 "Bad" Backup | Testdb1: Attribute "dataclass" value mismatch with signature 202A for SLP_BCP_GOLD_DB(SLP)<br>Expected value: Platinum<br>Actual value: Gold |
| GAP#2, Condition 402(2): DB Backup Policy for Y should have "snapshot" data copy | 1 "Good" Backup<br><br>1 "Bad" Backup | Test db2: Attribute "type" value mismatch with signature 202B for (OPERATION)<br>Expected value: 2(snapshot)<br>Actual value: 1(duplication) |
| GAP#3, Condition 402(3): Cluster 214 Resiliency Policy should have all systems with at least two HBAs | 26 "Good" Clusters<br><br>5 "Bad" Clusters | Clus 1: Relationship mismatch subdomain.domain.company.com (SYSTEM) does not have enough links to type HBA |
| GAP#4, Condition 402(4): System Resilience Policy should have cluster of systems with at least two HBAs | 300 "Good" Servers<br><br>7 "Bad" Servers | subdomain.domain.com : Relationship mismatch subdomain.domain.com (SYSTEM) does not have enough links to type HBA |
| ... | ... | ... |

Condition Table 400

*FIG. 4*

DETECTING DEVIATION OF DATA CENTER CONNECTIVITY BY CONDITIONAL SUB-GRAPH MATCHING

CROSS-REFERENCE TO RELATED APPLICATIONS

The present patent application is a continuation of U.S. patent application Ser. No. 14/143,669, filed on Dec. 30, 2013, entitled "Detecting Deviation of Data Center Connectivity by Conditional Sub-Graph Matching," listing Tushar Bandopadhyay as the inventor, and is incorporated by reference herein in its entirety and for all purposes as if completely and fully set forth herein.

FIELD OF THE INVENTION

This invention relates to data center connectivity and, more particularly, to detecting a deviation of an existing connectivity of a data center from a pre-determined connectivity.

DESCRIPTION OF THE RELATED ART

Data centers typically include high availability clusters, which are groups of computers that support server applications and can be utilized with a minimum amount of down-time, thus helping maintain business continuity. High availability clusters are often used for critical databases, file sharing on a network, business applications, and customer services such as electronic commerce websites. In the enterprise business continuity context, maintaining efficient and well-functioning connectivity and dependency between various components of a data center, while important, can pose challenges. For example, in such environments, components may fail, components may be added or removed, and/or other changes effected, thus altering the connectivity, dependency, and dynamic of the data center. These constant and sometimes arbitrary changes of connectivity and other comparable attributes results in risks to and deviation from a data center's connectivity and efficient functioning.

SUMMARY OF THE INVENTION

Various systems and methods for detecting a deviation of an existing connectivity of a data center from a pre-determined connectivity are presented. For example, one method involves detecting a deviation of an existing connectivity of a data center from a pre-determined connectivity by defining a start node. The start node is defined based on a condition of a component of the data center. The condition is determined based on an explicit relationship between a node and another node of the data center. In some embodiments, the method involves conditionally matching a sub-graph and a portion of a main graph by identifying the deviation. The conditional matching is begun at the start node. A failure to conditionally match a portion of the sub-graph and a portion of the main-graph indicates that the deviation exists.

Another method can involve visually representing a plurality of components of the data center by the main graph such that a component of the data center corresponds to a node. The condition of the node is evaluated to determine whether the node qualifies as the start node to begin the conditional matching. A signature that corresponds to the pre-determined connectivity is matched with the condition of the node, and if the signature matches the condition of the node, the node is identified as the start node. The start node represents the condition from which the conditional matching is begun.

Further, another component of the data center corresponds to another node. Upon conditionally matching the sub-graph and a portion of the main graph, the another node is identified as the next node. The next node is evaluated to determine whether the next node qualifies as the start node to begin the conditional matching. The signature that corresponds to the pre-determined connectivity is matched with the condition of the next node and the next node is identified as the start node (if the signature matches the condition of the next node), upon which, the conditional matching continues at the start node.

In another embodiment, an edge defines the explicit relationship between the node and the another node such that the node is an actual instantiation of a component of the data center and the another node is a specific instantiation of another component of the data center.

The edge between the node and the another node represents a common instantiation of at least one component of the data center and the explicit relationship is a relationship instantiation of the actual instantiation and the specific instantiation.

Further, a signature represented visually by the sub-graph defines the pre-determined connectivity of a portion of the data center represented by the sub-graph. The signature is associated with at least one rule governing the relationship between a plurality of components of the data center. The signature assigns a unique property to the node, the another node, and the edge, and parameterizes a plurality of extraneous node properties and a plurality of extraneous edge properties. Upon parameterization, the plurality of extraneous node properties and the plurality of extraneous edge properties are not associable with the respective unique properties assigned to the node, the another node, and the edge.

It will be appreciated that the conditional sub-graph matching can result in an iteration between the start node and the condition, such that, upon a first conditional matching of the sub-graph and a portion of the main graph, the another node is identified as the next node and the next node becomes the start node (if the signature matches the condition of the next node). Under this scenario, a second conditional matching begins with the next node (which has now been identified and assigned as the start node).

Furthermore, one particular method involves receiving information represented as a sub-graph, wherein the information is indicative of the pre-determined connectivity of the data center. The method comprises defining the start node based on the condition of the component of the data center and determining the condition based on the explicit relationship between the start node and the next node defined by the edge. The method further involves comparing the existing connectivity of the data center represented as the main graph and the pre-determined connectivity of the data center represented as the sub-graph.

According to one embodiment, comparing the existing connectivity of the data center represented as the main graph and the pre-determined connectivity of the data center represented as the sub-graph involves performing gap analysis on a condition, and further, conditionally matching the sub-graph and a portion of the main graph. The conditional matching is begun at the start node and the condition based on the explicit relationship between the start node and the next node indicates an iterative process such that, upon the conditional matching, the next node becomes the start node.

The deviation of the existing connectivity from the pre-determined connectivity is then identified.

Another method encompasses determining the deviation of the existing connectivity of the data center from the pre-determined connectivity by identifying the deviation based on a failure to conditionally match a portion of the sub-graph and a portion of the main graph. The method further involves analyzing the deviation by determining whether the deviation is significant enough to be actionable, and if it is, adjusting one or more components of the data center to harmonize the existing connectivity and the pre-determined connectivity.

Further, the common instantiation defines an existing capability of the data center by assigning a plurality of modifiable characteristics to the relationship instantiation. The relationship instantiation is modifiable based on the difference between a modifiable characteristic associated with the actual instantiation and another modifiable characteristic associated with the specific instantiation. Upon modification, the relationship instantiation reflects an upgraded capability of the data center.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 4 is a condition table illustrating a condition based gap analysis based on an example scenario, and the corresponding output, according to one embodiment of the present invention.

Figure 1:
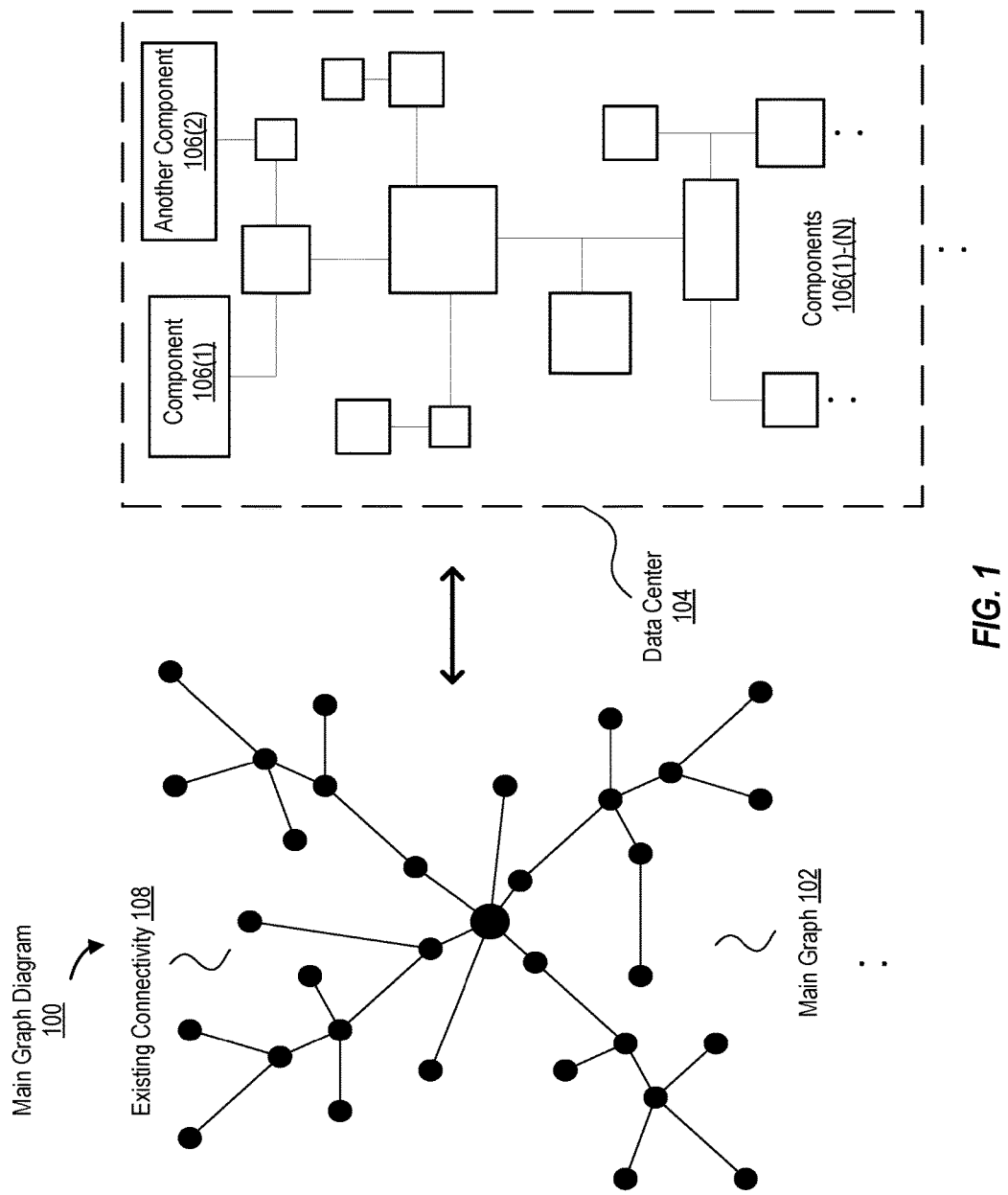
FIG. 1 is a block diagram of a main graph that represents an existing connectivity of the data center, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Introduction

Business continuity techniques can be employed that focus on either failover mechanisms, where, upon detection of a hardware or software failure, a business critical application is started on another system (e.g., a failover cluster in a high availability cluster), or on disaster recovery solutions, in which continuous availability of applications and systems is provided. However, existing solutions only provide relief once a failure has already occurred. There exists no system/method for proactively detecting risks to and deviations from a data center's connectivity.

In particular, it is desirable to be able to provide a method and a system for proactively determining a solution to any potential future changes to one or more components of a data center (e.g., a failure of one or more components), by testing the data center environment for deviations from a pre-determined architecture (e.g., topology, connectivity, facilities, and the like, as well as other elements, such as personnel, documents, etc.), which (based on one or more factors such as testing, redundancy, etc.) has been determined to be a desired connectivity under which to operate the data center.

An Example for Detecting a Deviation of an Existing Connectivity of a Data Center from a Pre-Determined Connectivity FIG. 1 is a block diagram of main graph 100 that represents an existing connectivity 108 of data center 104, according to one embodiment of the present invention. Data center 104 includes multiple components 106(1)-(N) (e.g., 106(1) and 106(2)). Main graph 100 represents (e.g., visually, in a graphical format via a graphical user interface (GUI)) the configuration of components 106(1)-(N) of data center 104. For example, the configuration of components 106(1)-(N) of data center 104 includes (and so takes into account), the topology of components 106(1)-(N), the connectivity of components 106(1)-(N), the hardware or software characteristics of components 106(1)-(N), and/or any other computational faculties that may attributed to one or more components 106(1)-(N).

Additionally, such elements can be broadly thought of as not only the mentioned components, but also elements such as documents, personnel, skills and other attributes, and other physical facilities (racks, desks, etc.) that may affect a data center's ability to provide a service. It will be appreciated that multiple data centers may be represented by a single main graph 100 or by several different main graphs (which may be combinable to form a single main graph 100). Data center 104 may be one of multiple disparate data centers, each with multiple disparate components (e.g., both hardware and software), or may exist independently. Data center 104 and other data centers may form a cluster of disparate data centers and may be geospatially independent (e.g., in disparate physical locations).

An Example Data Center Including Multiple Components and Configurations

Figure 2:
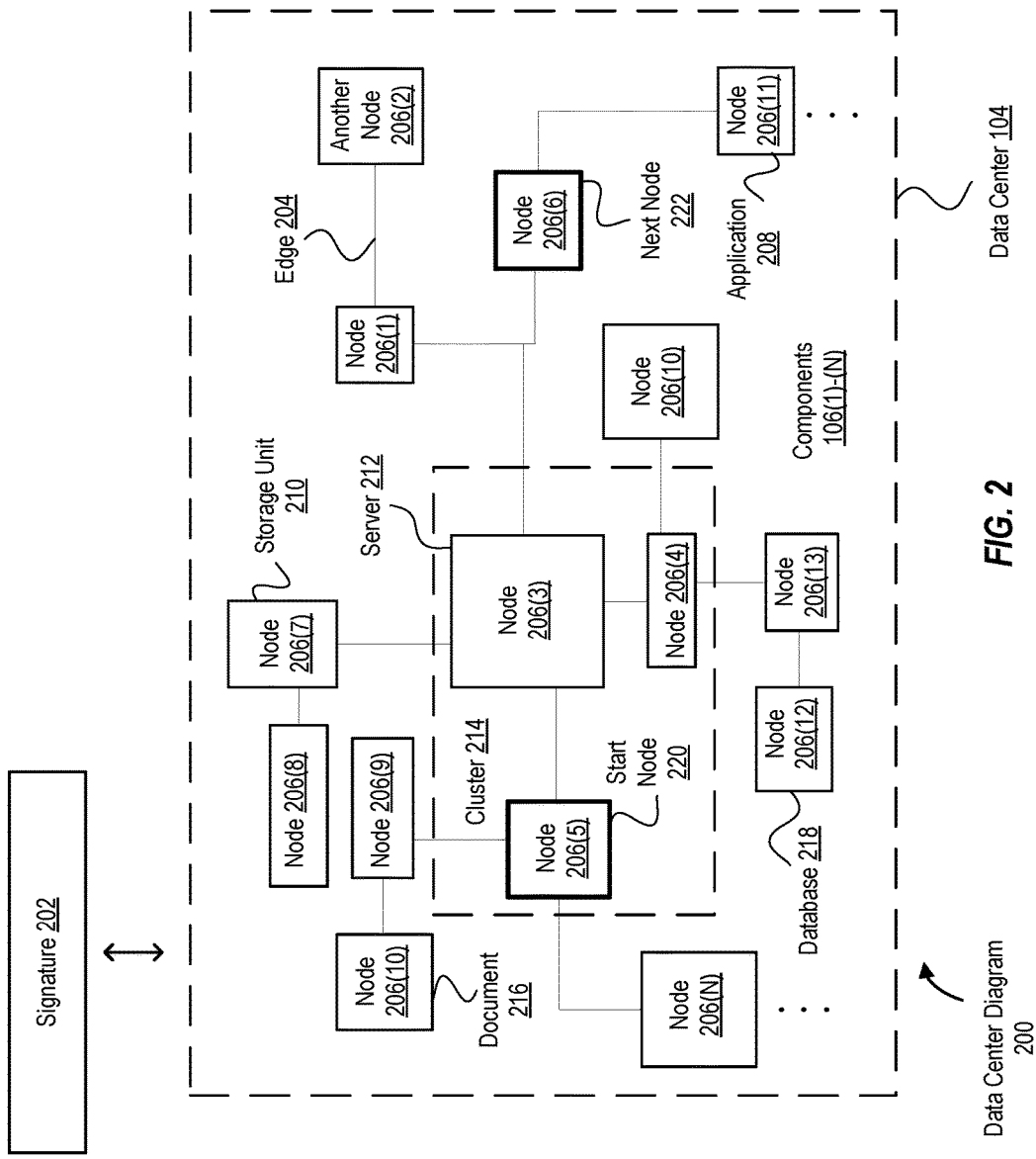
FIG. 2 is a block diagram of an example of a data center comprising a plurality of components, according to one embodiment of the present invention.

FIG. 2 is a block diagram of data center 104 comprising multiple components 106(1)-(N), according to one embodiment of the present invention. For example, data center 104 includes the following components: an edge 204, a node 206(1), another node 206(2), an application 208, a storage unit 210, a server 212, a cluster 214, a document 216, a database 218, a start node 220, and a next node 222. It will be appreciated that from a risk management and risk detection perspective, a company, organization, network administrator, etc. may have in mind, a desired connectivity of data center 104. For example, such a desired connectivity (e.g., a data center connectivity that a network administrator may consider ideal for a given situation, organization, time period, etc., which may include relationships, rather than physical and/or electrical connection or coupling), may be described in a Service Level Agreement (SLA). There may be different types of SLAs applicable to data center 104 such as SLAs based on availability, redundancy, data protection, data integrity, etc.

Typically, network administrators, information technology architects, database administrators, and the like, implement SLAs based on their organization or company's data needs, business demands, risk tolerance, security requirements, and network operations. For example, a network administrator may want to implement a redundancy-based model on data center 104 by requiring the following characteristics of data center 104 to be maintained: four paths from server 212 to storage unit 210, two servers for two applications, connectivity between data center 104 and another data center (e.g., a data center in a different physical location), a desired number of storage paths between server 212 and node 206(1) (e.g., five paths), and a desired number of network paths between application 208 and document 216 (e.g., four paths).

Ideally, the network administrator will want to know if the connectivity of data center 104 deviates from what the network administrator wants or needs sustained so that efficient functioning of the data center may be maintained to preserve business continuity. Considering that a typical corporate data center includes hundreds of thousands of components, applications, documents, servers, etc., it is challenging for the network administrator to detect and identify a deviation of data center 104 from a connectivity setting that the network administrator (or some other party) deems desirable (e.g., based on an SLA).

An Example for Detecting Deviation by Defining a Start Node Based on a Condition According to one embodiment, the method involves detecting a deviation of the existing connectivity 108 of data center 104 from a pre-determined connectivity by defining a start node 220. Start node 220 is defined based on a condition of component 106(1) of data center 104. Condition 402 is determined based on an explicit relationship between node 106(1) and another node 106(2) of data center 104. In an example embodiment, the method involves conditionally matching a sub-graph 302 and a portion of a main graph 102 by identifying the deviation. The conditional matching is begun at start node 220. A failure to conditionally match a portion of sub-graph 302 and a portion of main-graph 102 indicates that the deviation exists.

Figure 3:
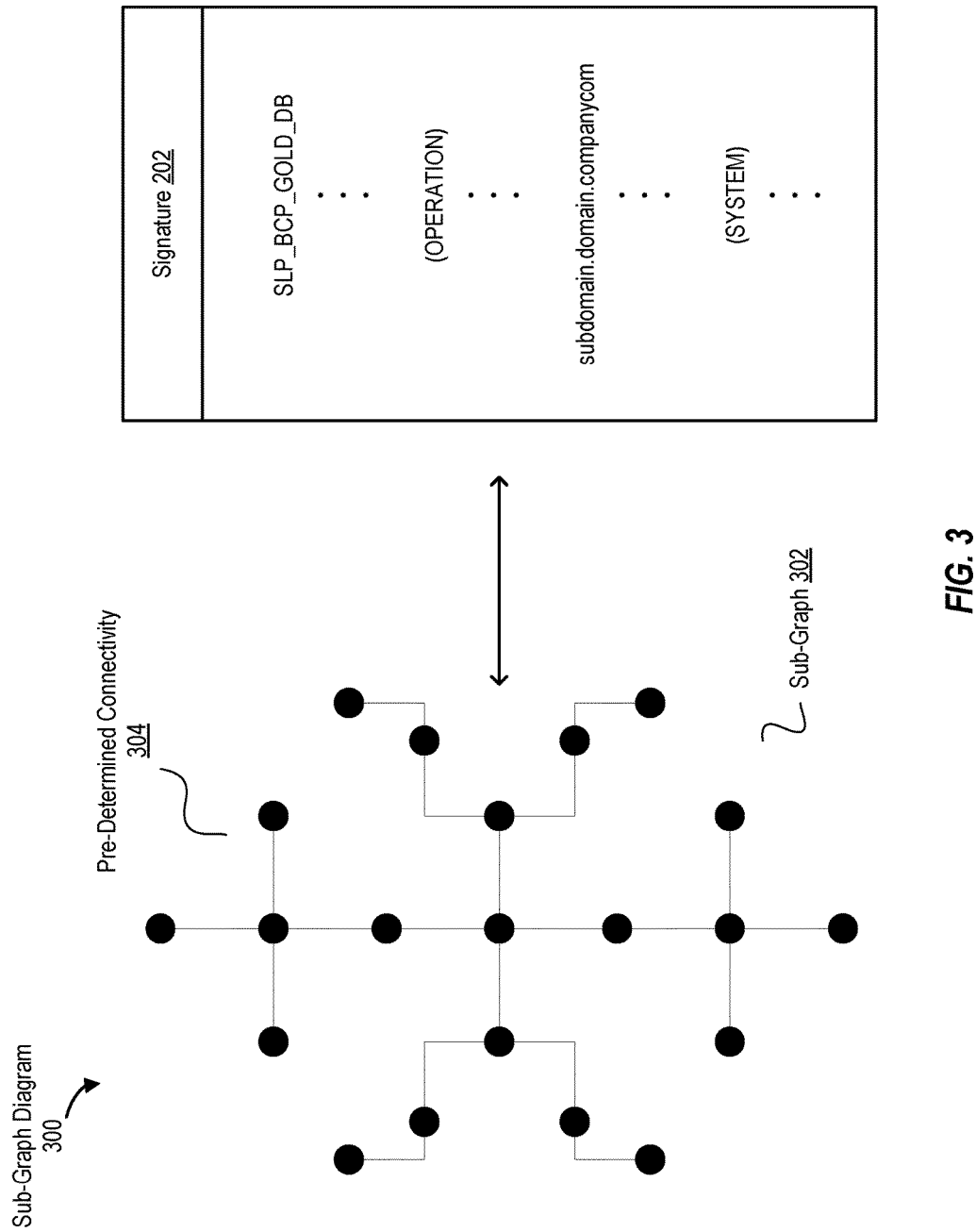
FIG. 3 is a block diagram of a sub-graph that represents a pre-determined connectivity of the data center and corresponds to a signature, according to one embodiment of the present invention.

FIG. 3 is a block diagram of sub-graph 302 that represents the pre-determined connectivity 304 (such as that described in connection with FIG. 2) of data center 104, according to one embodiment of the present invention. In the manner of existing connectivity 108 of data center 104, pre-determined connectivity 304 is also be represented visually (e.g., in a graphical format via a GUI). Pre-determined connectivity 304 represents a desired connectivity or ideal configuration of data center 104. For example, the network administrator may determine that based on network traffic, e-commerce sales, the number of users, and/or other such logistical factors, the configuration of data center 104 should include two paths for storage and two paths for network access. Based on this baseline requirement, there a risk may exist that the network administrator has inadvertently over-provisioned or under-provisioned data center 104.

According to an example embodiment, pre-determined connectivity 304 of data center 104 is represented as sub-graph 302. Data center 104, in its entirely (including all components and various connectivity paradigms), is represented graphically via sub-graph 302. Although sub-graph 302 may appear disjointed from an application perspective, in a data center setting, each component of multiple components 106(1)-(N) is associated with a specific node (e.g., node 206(1)-(N)). Therefore, when pre-determined connectivity 304 of data center 104 is represented through a graph (e.g., as sub-graph 302), any possible over-provisioning or under-provisioning of data center 104 can be corrected by comparing sub-graph 302 to main graph 102. The comparison is facilitated, for example, by signature 202 as illustrated in FIG. 3. Signature 202 represented visually by and associated with sub-graph 302, defines the pre-determined connectivity 304 of a portion of data center 104 represented by sub-graph 302.

An Example of Condition-Based Gap Analysis

FIG. 4 is a condition table 400 illustrating a condition (depicted in FIG. 4 as condition 402) based gap analysis, based on a scenario (depicted in FIG. 4 as scenario 404), resulting in a corresponding output 406, according to one embodiment of the present invention. It will be appreciated that output 406 reflects one or more outcomes that result when condition 402 is applied to scenario 404. For example, condition 402 may require data center 104 to have a database 218 backup policy with a platinum data class status (e.g., a database backup policy for high-level, important, or sensitive data). In this way, condition 402 defines a particular requirement applicable to component 106(1) of data center 104 based on the explicit relationship of node 206(1) associated with component 106(1), and another node 206(2) associated with another component 106(2).

Scenario 404 reflects the number of components of data center 104 that are of concern to a network administrator. For example, the network administrator may only be concerned, for evaluation purposes, about two very important servers because these servers include highly-sensitive information of critical importance to the company. The network administrator is free to choose, for evaluation purposes, as many or as few components as needed as well as a myriad of various combinations of components (e.g., servers, clusters, nodes, documents, databases, applications, etc.).

Output 406 is determined upon matching condition 402 to scenario 404. Output 406 indicates whether the selected components pass or fail the imposed condition 402 and also indicates an expected value (based on condition 402) and an actual value (based on testing condition 402 on scenario 404). In this manner, testing condition 402 of node 206 determines whether node 206 qualifies as start node 220 to begin the conditional matching.

An Example of Identifying and Qualifying a Start Node to Begin Conditional Matching by Comparing a Signature and a Condition According to one embodiment, multiple components 106(1)-(N) of data center 104 are represented visually by main graph 102. In this representation, component 106(1) of data center 104 corresponds to node 206(1) (e.g., component 106(1) is represented and associated with node 206(1), either physically or logically). In an example embodiment, condition 402 of node 206(1) is evaluated to determine whether node 206(1) qualifies as start node 220 to begin the conditional matching upon which signature 202 that corresponds to pre-determined connectivity 304 is matched with condition 402 of node 206(1). Node 206(1) is identified as start node 220 if signature 202 matches condition 402 of node 206(1). Start node 220 represents condition 402 from which the conditional matching is begun.

In another embodiment, another component 106(2) of data center 104 corresponds to another node 206(2). Upon conditionally matching sub-graph 302 and a portion of main graph 102, another node 206(2) is identified as the next node 222. Next node 222 is evaluated to determine whether next node 222 qualifies as start node 220 to begin the conditional matching. Signature 202 that corresponds to pre-determined connectivity 304 is matched with condition 402 of next node 222. If signature 202 matches condition 402 of next node 222, next node 222 is identified as the next start node 220, upon which, the conditional matching continues at start node 220.

An Example of Signature-Based Conditional Sub-Graph Matching

In an example embodiment, signature 202 represented visually by sub-graph 302, defines pre-determined connectivity 304 of a portion of data center 104, represented by main graph 102. Signature 202 identifies the characteristics of data center 104 that represent its optimal or desired state of operation. Signature 202 can be created and modified by a network administrator according to company policy, or it can be automatically created or updated based on an operation of another data center. For example, a company could have a need to provide server-based services to a thousand employees. These servers may be represented as multiple instances. The servers may be part of a cluster 214. The company may require (for whatever reason) that all the servers (e.g., server 212(1)-(N)) part of cluster 214 be identical (e.g., identical software-wise, hardware-wise, etc.). This may be a catch-all requirement.

There may be additional requirements imposed such as for example, if server 212 is part of cluster 214, it must also be connected to storage unit 210 and have a minimum storage requirement of 100 gigabytes. Even more requirements applicable to the same server 212 may be imposed such as for example, if node 206 is of type server 212 and is connected to storage unit 210, then server 212 must have a memory capability of 100 gigabytes. The example mentioned above, wherein requirements imposed on components of data center 104 build on each other, is signature 202, according to an example embodiment. Therefore, signature 202 may potentially include any combination of requirements (exponential or otherwise) imposed on data center 104 and its components.

It will be appreciated that signature 202 (because signature 202 is associated with a rule out of multiple rules governing the relationship between multiple components 106(1)-(N) of data center 104), is useful in pinpointing components of data center 104 from which to begin the conditional matching, according to one embodiment. For example, and based on the example earlier discussed, a data center architect may search for all nodes of type server within data center 104. Out of all the nodes that are of type server, the data center architect may identify all the nodes that are connected to cluster 214. Assuming, for example, that this aforementioned query results in ten servers, the data center architect can further drill down (e.g., by conditionally matching sub-graph 302 and main graph 102) and ascertain the number of servers (out of the ten previously queried) that include 100 gigabytes of storage capacity and 100 gigabytes of memory capability. If two servers do not meet this further-imposed requirement per signature 202 (e.g., there exists a failure to conditionally match a portion of sub-graph 302 and a portion of main graph 102), the data center architect can tag the two servers for further observation and action (e.g., by possibly modifying their storage and memory characteristics to harmonize the two servers with the remaining eight servers).

According to one embodiment, signature 202 includes information that facilitates assignment of one or more unique properties to node 206(1), another node 206(2), and edge 204(1-2) (indicating that edge 204 defines the explicit relationship between the node 206(1) and another node 206(2)). Because the focus of detecting a deviation of data center 104 is typically on the un-matched nodes, signature 202 parameterizes multiple extraneous node properties and multiple extraneous edge properties such that extraneous node properties and extraneous edge properties are not associable with the respective unique properties assigned to node 206(1), another node 206(2), and edge 204(1-2). For example, signature 202 (via a template) may indicate only the attribute applicable to a node of type server with the required characteristics, and thus, the remaining attributes of the node (which do not correspond to the signature) can be parameterized.

In another example, server 212 may have one hundred hardware and software properties, but if signature 202 only has one hardware property of importance (e.g., one property that is a requirement imposed by signature 202 that is associated with a data center 104's desired configuration and/or operation as depicted by pre-determined connectivity 304 and sub-graph 302), then the remaining properties can be parameterized (e.g., not compared by the conditional matching of sub-graph 302 and main graph 102). Therefore, based on using a modifiable and updateable signature 202 based sub-graph 302 matching, data center 104's real-time functioning and capability may be accurately ascertained by detecting a deviation of existing connectivity 108 of data center 104 from pre-determined connectivity 304.

An Example of an Edge Defining an Explicit Relationship

According to an example embodiment, edge 204(1-2) explicitly defines one or more relationships between node 206(1) and another node 206(2). Node 206 (1) may be an actual instantiation of component 106(1) of data center 104, for example. Another node 206(2) may be a specific instantiation of the another component 106(2) of data center 104. In comparable fashion, edge 204 between node 206(1) and another node 206(2) represents a common instantiation of one component of data center 104. The explicit relationship is a relationship instantiation of the actual instantiation and the specific instantiation.

Edges represent some manner of relationship between nodes. Edge 204 is a representation, for example, in a database, of a relationship between two database constructs.

For example, a database may include a parent table and a child table. Instead of implicitly defining a relationship between an object in the parent table and an object in the child table, edge 204 may explicitly define a relationship between two nodes (e.g., node 206(1) and another node 206(2)) as a specific property (e.g., node 206(1) and another node 206(2) must both be a certain brand of servers running a certain brand of database and connected to storage unit 210 using a single high-capacity path).

For example, in the context of data center 104, server 212 may be installed with application 208. Edge 204 may explicitly define a relationship between server 212 and application 208 (e.g., by noting in a table that application 208 is installed on server 208). Server 212 (represented as node 206(1)) may have its own properties (e.g., the number of sockets, memory capabilities, the type of processor, etc.). For example, if server 212 has ten installed copies of application 208 (represented as node 206(2)), node 206(2) may, according to one embodiment, hold all the common properties of all ten different installed versions of application 208 (e.g., application 208, version 2.0). All other instances of application 208 (instances of application 208 with no common and/or shared properties), may have their own separate nodes. In this case, edge 204 would define the explicit relationship between the node represented by specific instances of application 208, version 2.0 and the node represented by server 212.

Hence, by utilizing edges to define explicit relationships between nodes, data center 104 may be efficiently represented by characterizing the particular characteristics of each component as a relationship between that component and another component. In addition, because each node may have its own properties and each edge may have additional properties (in addition to the defined explicit relationship), the properties of nodes and edges may interpreted and modified as needed or desired, for example, by the network administrator, data center architect, or any other person or process (implemented manually, or automatically through a computer, in either a static or dynamic fashion) that has a role in determining the desired connectivity of data center 104 (e.g., pre-determined connectivity 304).

An Example of Detecting a Deviation by Conditional Sub-Graph Matching

Figure 5:
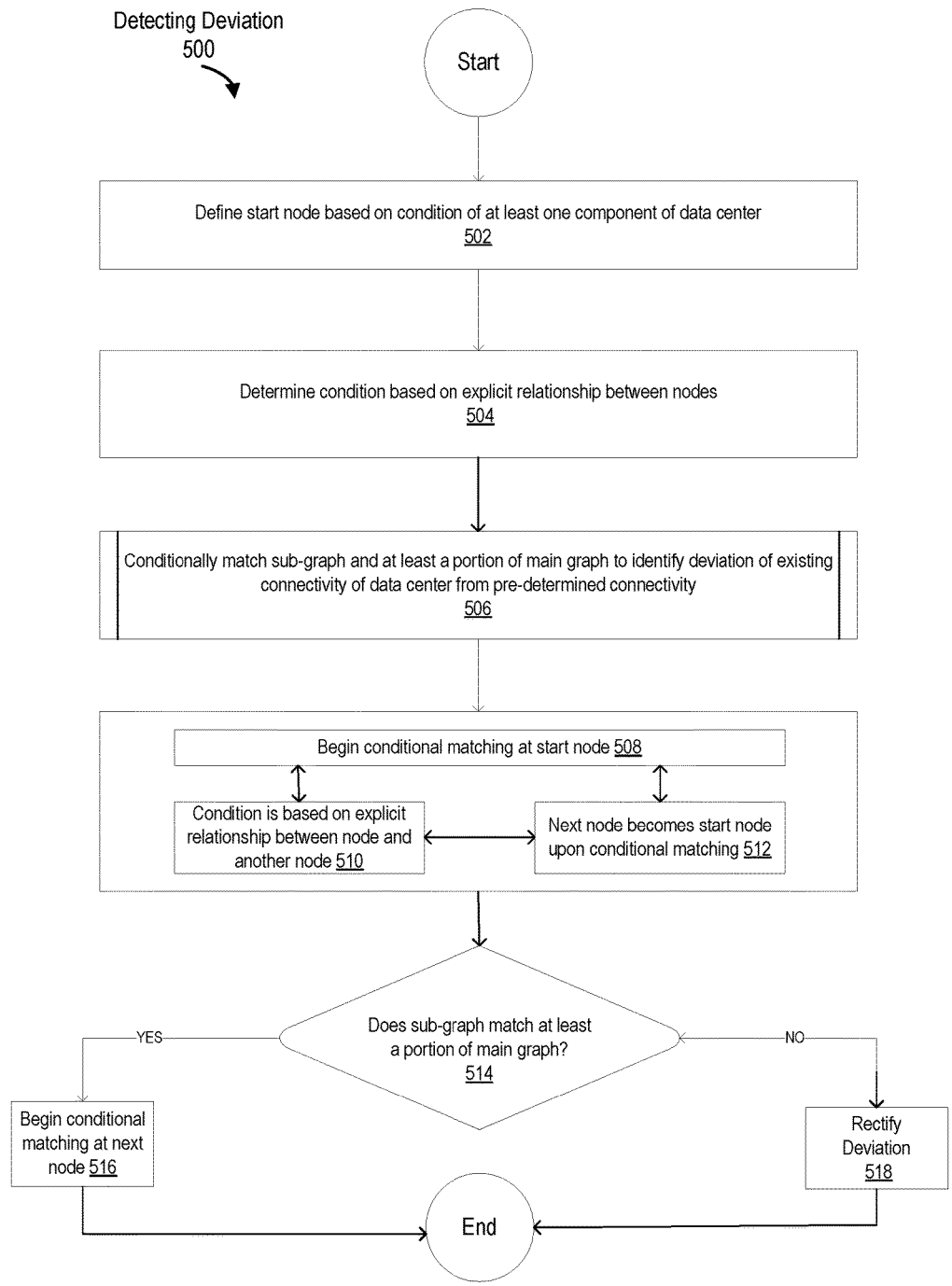
FIG. 5 is a flowchart for detecting deviation, according to one embodiment of the present invention.

FIG. 5 is a is a flowchart for detecting deviation of existing connectivity 108 from pre-determined connectivity 304. According to one embodiment, detecting deviation includes defining start node 220 based on condition 402 of one component 106(1) of data center 104 and determining condition 402 based on the explicit relationship between node 206(1) and another node 206(2) defined by edge 204(1-2). Detecting deviation may also include conditionally matching sub-graph 302 and a portion of main graph 102 to identify the deviation of connectivity 108 from pre-determined connectivity 304.

The conditional matching begins at start node 220 wherein condition 402 is based on the relationship between node 206(1) and another node 206(2), and next node 222 becomes start node 220 upon the conditional matching. It will be appreciated that, upon the conditional matching, a deviation exists if sub-graph 302 does not match a portion of main graph 102, and a deviation does not exist if sub-graph 302 matches a portion of main graph 102, according to one or more embodiments.

Applying sub-graph traversal to data center 104 is an efficient method to detect risk in data center 104 and helps determine whether data center 104 is over-provisioned or under-provisioned. In one embodiment, the method involves receiving information represented as sub-graph 302 wherein the information is indicative of a pre-determined connectivity 304 of data center 104 out of multiple disparate data centers (e.g., multiple data centers spread across various geographic regions, each comprising multiple different components and configurations). Once the information is received, a start node 220 is defined based on a condition 402 of a component of data center 104 (out of multiple data centers). It will be appreciated that condition 402 is determined based on a relationship between start node 220 and next node 222 defined by an edge (e.g., edge 204(220-222)). Comparing the existing connectivity 108 of data center 104 represented as a main graph 102 and the pre-determined connectivity 304 of data center 102 represented as the sub-graph 302 reveals whether a deviation exists.

In another embodiment, the method involves first evaluating a condition 402 of a node (e.g., node 206(1)) to determine whether node 206(1) is the proper node (whether node 206(1) qualifies as start node 220 based on condition 402 and signature 202). Once start node 220 is determined, signature 202 may be matched to sub-graph 302 to determine whether data center 104 is over-provisioned, under-provisioned, or whether output 406 simply indicates a risk to data center 104's operability (e.g., based on a failure of one or more components of data center 104).

In another embodiment, start node 220 is associated with condition 402 from which conditional matching is begun. A signature 202 is created that takes into account condition 402 as it applies to multiple nodes (e.g., server 212 or cluster 214). According to this aspect, each traversal or each edge is influenced by the same condition 402 (e.g., GAP#4 of FIG. 4). For example, in a situation involving the aforementioned traversed condition, condition 402 may permit the conditional matching to begin only if server 212 is part of cluster 214 and if there exists an edge between the server node and the cluster node that includes a unique property. In the case of the traversed condition, conditional matching may begin from either node 206(1) associated with server 212 or from another node 206(2) associated with cluster 214. If the conditional matching begins at node 206(1) associated with server 212 and if server 212 is not part of cluster 214, then the matching stops. The remaining servers 212(2)-(N) need not be evaluated (though, those servers can be evaluated, for example). In the present example, a first failure reveals a server which is not part of cluster 214. Because condition 402 has been met, no other servers need to be evaluated.

On the other hand, and according to one or more embodiments, if the conditional matching begins at node 206(2) associated with cluster 214, the servers that are part of cluster 214 are evaluated by matching signature 202 to sub-graph 302 to determine if edge 204 between the server node and the cluster node matches the aforementioned unique property. Therefore, it will be appreciated that by associating start node 220 with a condition that has traversal capabilities, the direction or the exact location from which the conditional matching begins does not hinder detecting a deviation, because a first failure or a reverse traversal as revealed by output 406 illustrates any over-provisioning or under-provisioning of data center 104 or a risk to data center 104's potential operability and/or functionality.

An Example of Conditional Matching of a Sub-Graph and a Main Graph

Figure 6:
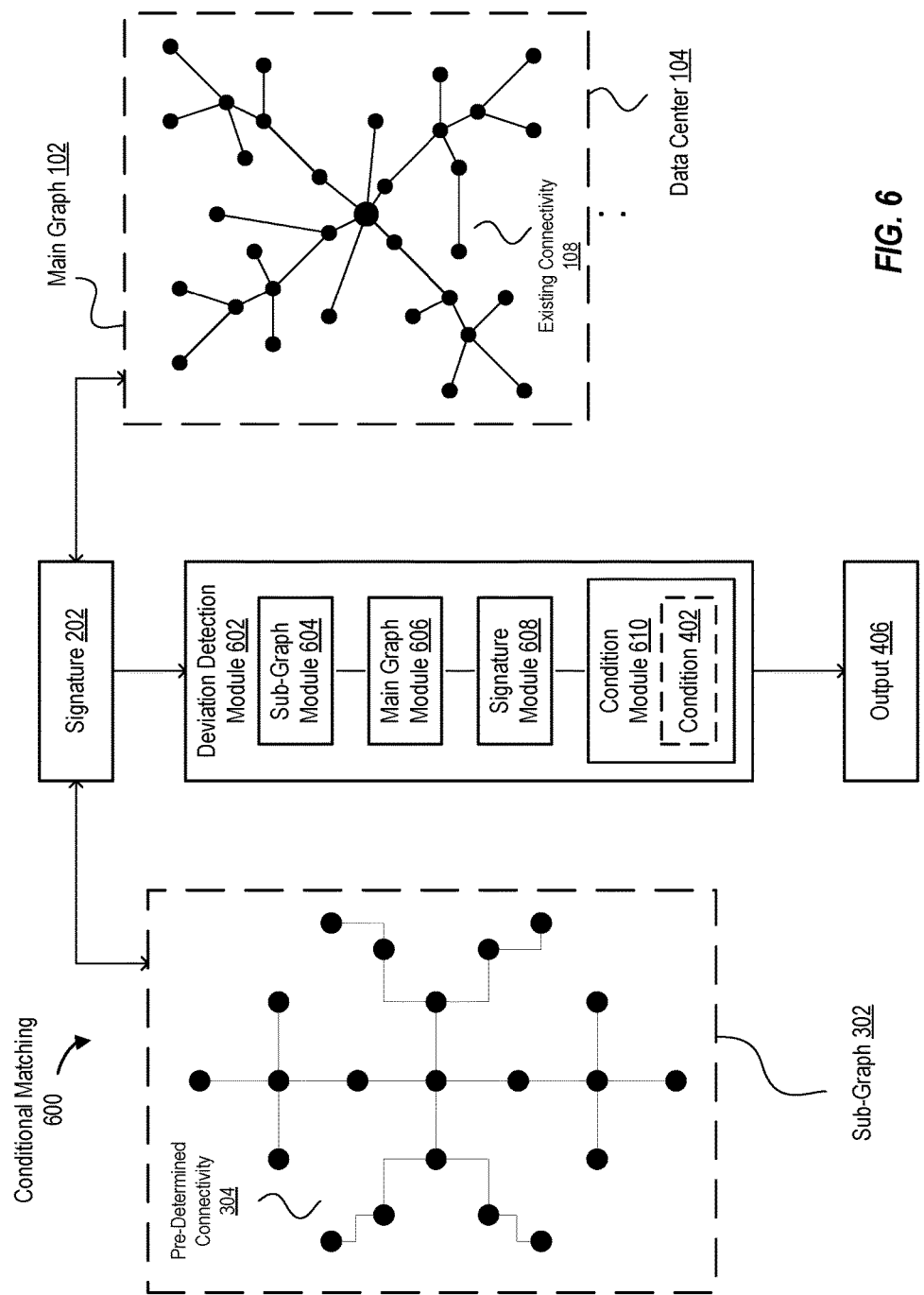
FIG. 6 is a block diagram illustrating an example conditional matching of the sub-graph and main graph, according to one embodiment of the present invention.

FIG. 6 is a block diagram illustrating conditional matching of sub-graph 302 and main graph 102, according to one embodiment of the present invention. Comparing and matching existing connectivity 108 of data center 104 represented as main graph 102 and pre-determined connectivity 304 of data center 104 represented as sub-graph 302, includes performing gap analysis on condition 402 as illustrated by FIG. 4 and FIG. 6. Signature 202 represented visually by sub-graph 302 defines pre-determined connectivity 304 of a portion of data center 104 represented by main graph 102. The comparing of connectivity also includes conditionally matching sub-graph 302 and a portion of main graph 102.

When conditional matching is begun at start node 220, condition 402 based on the explicit relationship between start node 220 and next node 222 indicates an iterative process such that, upon the conditional matching, next node 222 becomes start node 220. The iterative process identifies the deviation of existing connectivity 108 from pre-determined connectivity 304. In this manner (e.g., through the aforementioned iterative process of defining new start nodes until condition 402 is met) the conditional sub-graph matching continues until a failure (indicating some manner of deviation) is detected.

In one embodiment, signature 202 represented visually by sub-graph 302, defines pre-determined connectivity 304 of a portion of data center 104, represented by main graph 102. Main graph 102, sub-graph 302, and signature 202 are processed with condition 402 to determine a deviation. The result of produced is output 406.

An Example of Comparing Connectivity by Performing Gap Analysis

Figure 7:
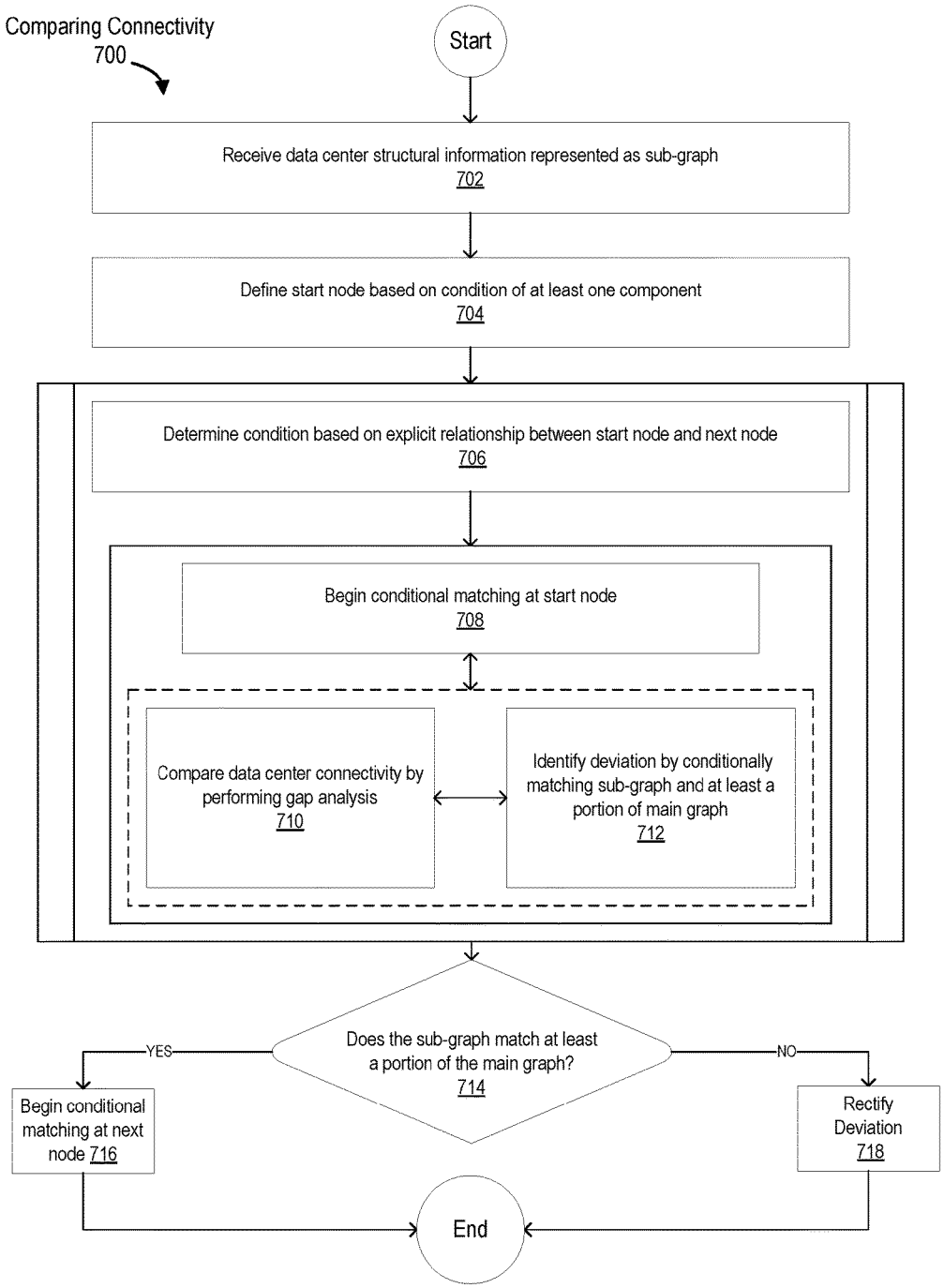
FIG. 7 is a flowchart for comparing connectivity, according to one embodiment of the present invention.

FIG. 7 is a flowchart for comparing connectivity, according to one embodiment of the present invention. Comparing connectivity, according to one embodiment, involves receiving information represented as sub-graph 302 and indicative of pre-determined connectivity 304 of data center 104 (out of multiple disparate data centers) and defining start node 220 based on condition 402 of one component (e.g., component 106(1)) out of multiple components 106(1)-(N) of data center 104 (out of multiple disparate data centers). Condition 402 is determined based on an explicit relationship between start node 220 and next node 222 defined by edge 204.

According to one embodiment, performing gap analysis (e.g., a comparison of actual performance of data center 104 with potential performance) involves comparing existing connectivity 108 (represented as main graph 102) and pre-determined connectivity 304 (represented as sub-graph 302) by conditionally matching sub-graph 302 and a portion of main graph 102. The comparison identifies the deviation of existing connectivity 108 from pre-determined connectivity 304. The conditional matching is begun at start node 220 where condition 402 based on the explicit relationship between start node 220 (e.g., node 206(1)) and next node 222 (e.g., another node 206(2)), indicates an iterative process such that next node 220 becomes start node 220 upon the conditional matching.

In another embodiment, the conditional sub-graph matching results in an iteration between start node 220 and condition 402 wherein upon a first conditional matching of sub-graph 302 and a portion of main graph 102, another node 206(2) is identified as next node 222 and next node 222 becomes start node 220 if signature 202 matches condition 402 of next node 222. A second conditional matching begins with next node 222.

An Example of Processing a Deviation

Figure 8:
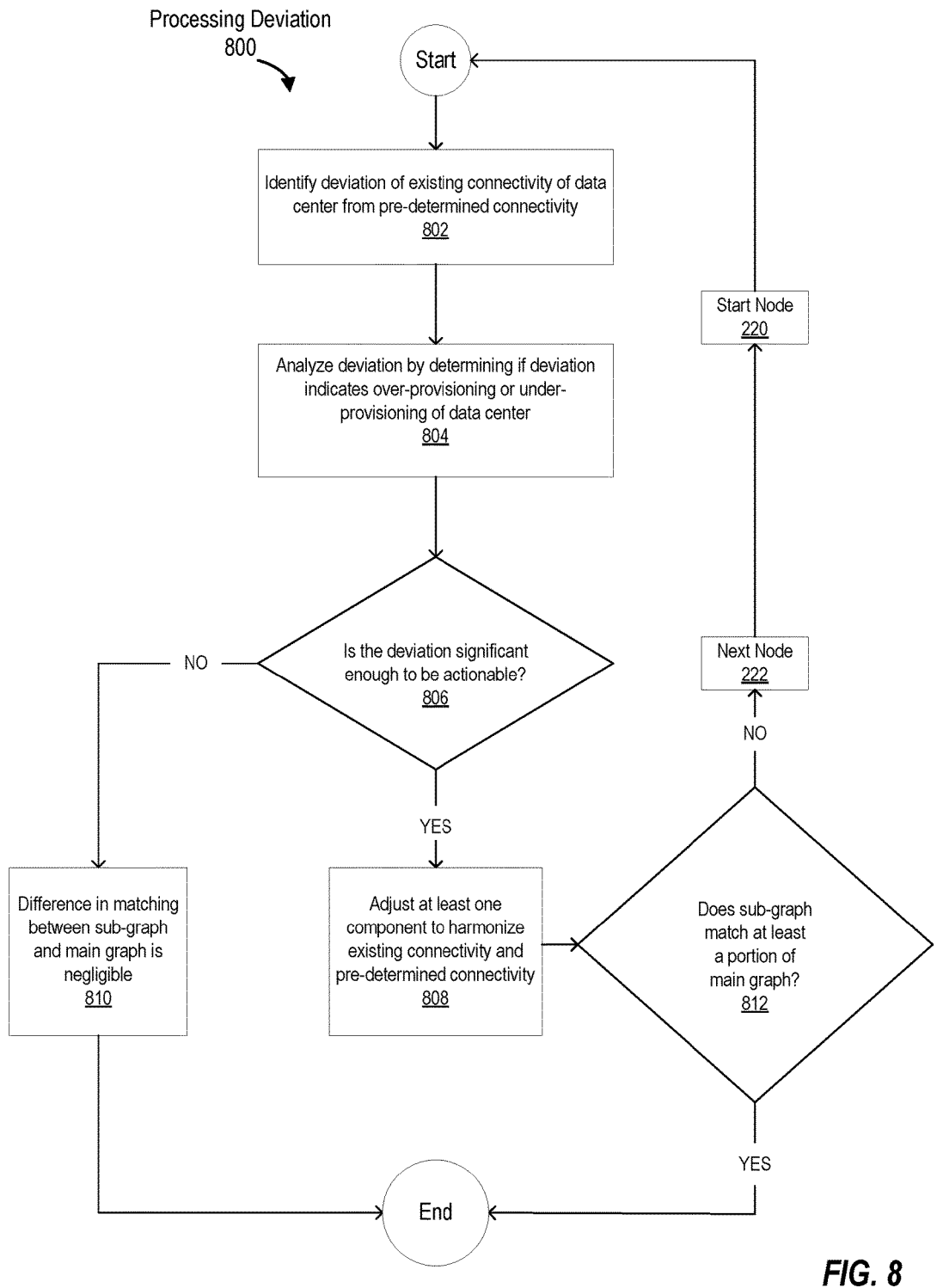
FIG. 8 is a flowchart for processing deviation, according to one embodiment of the present invention.

FIG. 8 is a flowchart for processing a deviation, according to one embodiment of the present invention. It will be appreciated that upon deviation of existing connectivity 108 of data center 104 from pre-determined connectivity 304, the deviation is identified (e.g., based on the failure to conditionally match a portion of sub-graph 302 and a portion of main graph 102) and analyzed. For example, the deviation is analyzed by determining whether it is significant enough to be actionable (e.g., a determination based on an SLA and upon detection of the deviation, of whether data center 104 is significantly over-provisioned or under-provisioned).

According to one embodiment, if the deviation is significant enough to be actionable, an adjustment may be made to a component (e.g., a failed component, an over-provisioned cluster of servers, etc.), out of multiple components 106(1)-(N), to harmonize existing connectivity 108 and pre-determined connectivity 304. If the difference in matching between sub-graph 302 and main graph 102 is negligible (e.g., failure of server 212(1) in cluster 214 does not affect the performance of cluster 214), then no action may be taken. However, if after the adjustment, sub-graph 302 still does not match a portion of main graph 102, the iterative process ensures that an alternate node (e.g., another node 106(2)) is identified as next node 222 and next node 222 becomes start node 220 if signature 202 matches condition of next node 222. The conditional matching continues with next node 222 (which now assumes the role of start node 220).

It will be appreciated that, according to one or more embodiments, components 106(1)-(N) of data center 104 may be represented virtually as one or more instances. For example, a common instantiation may define an existing capability of data center 104 (e.g., represented by existing connectivity 108) by assigning multiple modifiable characteristics to the relationship instantiation (e.g., to the explicit relationship between node 206(1) and 206(2) as defined by edge 204(1-2)). The relationship instantiation may be modifiable based on the difference (e.g., a deviation) between a modifiable characteristic associated with the actual instantiation (e.g., database 218) and an another modifiable characteristic associated with the specific instantiation (e.g., a copy of database 218). Upon the modification (e.g., an addition of memory capacity to server 212 on which database 218 resides) to harmonize existing connectivity 108 and pre-determined connectivity 304, the relationship instantiation may reflect an upgraded capability of data center 104.

According to one or more embodiments, attributes of the various components of data center 104 are parameterized. Because signature 202 explicitly defines node 206 based on edge 204, only nodes with which are of importance (e.g., nodes, with specific properties or attributes, which meet condition 402) are traversed. For example, if signature 202 requires a specific property or attribute of server 212 (e.g., server 212 has an Intel® processor) out of hundreds of other properties or attributes of server 212 (e.g., server 212 has 100 gigabytes of storage and has ten storage units), only the property or attribute relating to server 212's processor is traversed. The other properties or attributes are assigned a null value and parameterized (e.g., they are ignored in the conditional sub-graph matching process). However, if additional properties or attributes becomes desirable for the purposes of data center 104's connectivity, the additional properties or attributes may easily be made a part of condition 402 by being included in an update or modification to signature 202.

From a risk analysis perspective, it will be appreciated that attribute parameterization with updateable conditionals permits an efficient mapping and survey of data center 104. When risk analysis is implemented by conditional sub-graph traversal, a node which does not meet condition 402 is not traversed because it will not qualify as start node 220. Unlike conventional systems and methods for risk detection where all nodes are homogeneous, the invention uses signature 202 to define node 206 and its particular properties and attributes, which may be modified and updated based on the requirements of data center 104.

Enterprise business continuity depends on the efficient functioning of applications, servers, storage units and other components of a data center. Representing these various components granularly as sub-graphs (e.g., in a graphical format) that takes into account their existing connectivity and compares it with a desired connectivity, ensures that a desired connectivity may be maintained by efficiently and accurately determining any deviation from the desired connectivity due to a real-time change in the data center's environment (e.g., by performing proactive and real-time gap analysis).

Therefore, it will be appreciated that the methods and systems described herein may assist in detecting undesirable conditions in the enterprise business continuity configuration by representing various data center components and their desired connectivity as graphs and sub-graphs to perform selective sub-graph matching.

An Example of a Computing Environment

Figure 9:
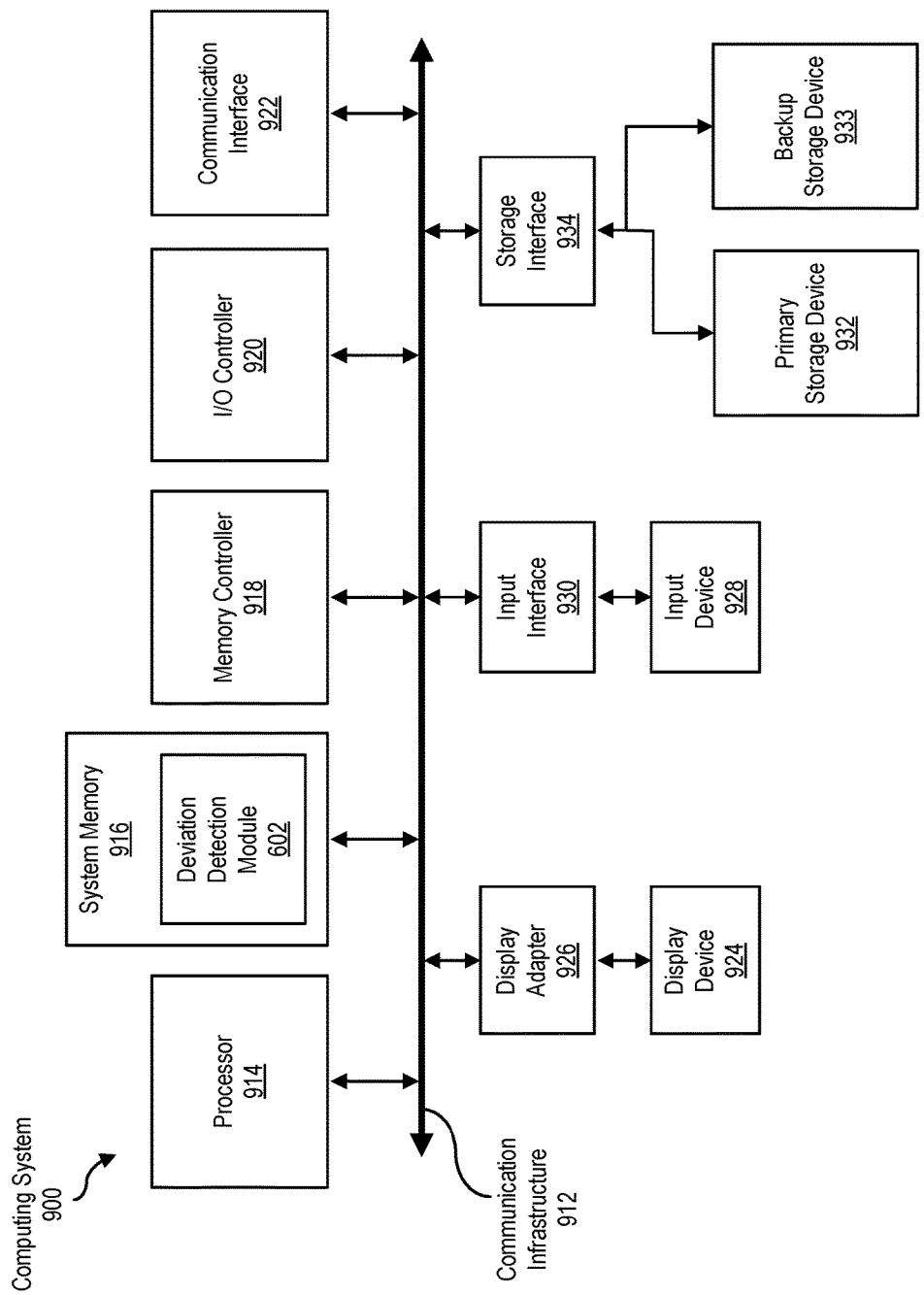
FIG. 9 is a block diagram of a computing device, illustrating how a deviation detection module can be implemented in software, according to one embodiment of the present invention.

FIG. 9 is a block diagram of a computing system 900 capable of detecting deviation of a data center connectivity as described above. Computing system 900 broadly represents any single or multi-processor computing device or system capable of executing computer-readable instructions. Examples of computing system 900 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 900 may include at least one processor 914 and a system memory 916. By executing the software that implements deviation detection module, computing system 900 becomes a special purpose computing device that is configured to detect deviation of a data center's connectivity.

Processor 914 generally represents any type or form of processing unit capable of processing data or interpreting and executing instructions. In certain embodiments, processor 914 may receive instructions from a software application or module. These instructions may cause processor 914 to perform the functions of one or more of the embodiments described and/or illustrated herein. For example, processor 914 may perform and/or be a means for performing the operations described herein. Processor 914 may also perform and/or be a means for performing any other operations, methods, or processes described and/or illustrated herein.

Figure 10:
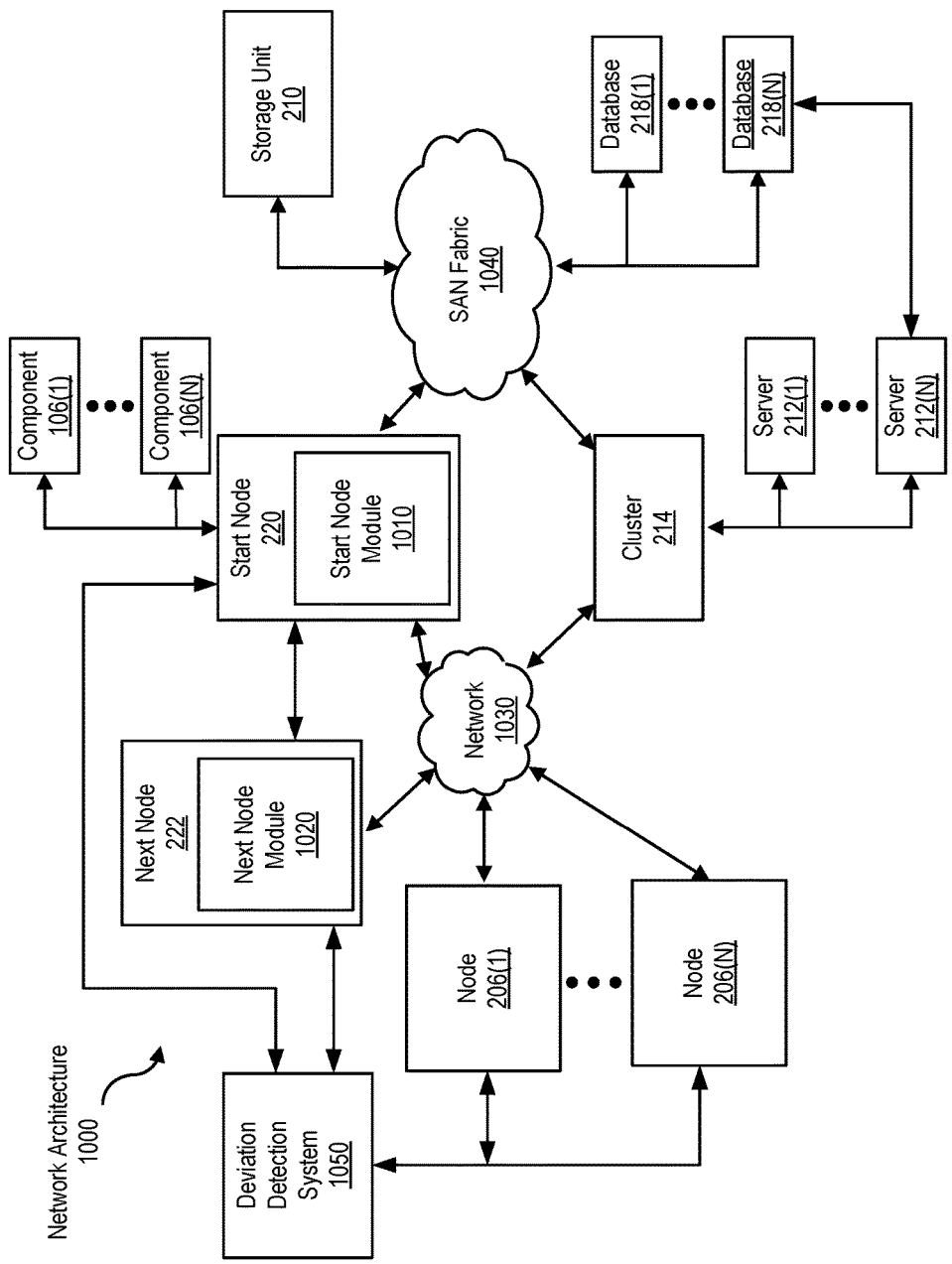
FIG. 10 is a block diagram of a networked system, illustrating how various computing devices can communicate via a network, according to one embodiment of the present invention.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 900 may include both a volatile memory unit (such as, for example, system memory 916) and a non-volatile storage device (such as, for example, primary storage device 932, as described in detail below). In one example, program instructions executable to implement a deviation detection module 602 (e.g., a start node module 1010 or next node module 1020 as shown in FIG. 10) may be loaded into system memory 916.

In certain embodiments, computing system 900 may also include one or more components or elements in addition to processor 914 and system memory 916. For example, as illustrated in FIG. 9, computing system 900 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI express (PCIe), or similar bus) and a network.

Memory controller 918 generally represents any type or form of device capable of handling memory or data or controlling communication between one or more components of computing system 900. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the operations or features described and/or illustrated herein.

I/O controller 920 generally represents any type or form of module capable of coordinating and/or controlling the input and output functions of a computing device. For example, in certain embodiments I/O controller 920 may control or facilitate transfer of data between one or more elements of computing system 900, such as processor 914, system memory 916, communication interface 922, display adapter 926, input interface 930, and storage interface 934.

Communication interface 922 broadly represents any type or form of communication device or adapter capable of facilitating communication between computing system 900 and one or more additional devices. For example, in certain embodiments communication interface 922 may facilitate communication between computing system 900 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 900 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 922 may also allow computing system 900 to engage in distributed or remote computing. For example, communication interface 922 may receive instructions from a remote device or send instructions to a remote device for execution.

As illustrated in FIG. 9, computing system 900 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

In addition, computing system 900 may also include at least one input device 928 coupled to communication infrastructure 912 via an input interface 930. Input device 928 generally represents any type or form of input device capable of providing input, either computer or human generated, to computing system 900. Examples of input device 928 include, without limitation, a keyboard, a pointing device, a speech recognition device, or any other input device.

Furthermore, computing system 900 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 900. A storage device like primary storage device 932 can store information such as backup images and/or a backup catalog.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 900. For example, storage devices 932 and 933 may be configured to read and write software, data, or other computer-readable information. Storage devices 932 and 933 may also be a part of computing system 900 or may be a separate device accessed through other interface systems.

Many other devices or subsystems may be connected to computing system 900. Conversely, all of the components and devices illustrated in FIG. 9 need not be present to practice the embodiments described and/or illustrated herein. The devices and subsystems referenced above may also be interconnected in different ways from that shown in FIG. 9.

Computing system 900 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 900 for storage in memory via a network such as the Internet or upon a carrier medium.

The computer-readable medium containing the computer program may be loaded into computing system 900. All or a portion of the computer program stored on the computer-readable medium may then be stored in system memory 916 and/or various portions of storage devices 932 and 933. When executed by processor 914, a computer program loaded into computing system 900 may cause processor 914 to perform and/or be a means for performing the functions of one or more of the embodiments described and/or illustrated herein. Additionally or alternatively, one or more of the embodiments described and/or illustrated herein may be implemented in firmware and/or hardware. For example, computing system 900 may be configured as an application specific integrated circuit (ASIC) adapted to implement one or more of the embodiments disclosed herein.

FIG. 10 is a block diagram of a network architecture 1000 in which nodes 206(1)-(N), components 106(1)-(N), databases 218(1)-(N), and servers 212(1)-(N) may be coupled to a network 1030. Nodes 206(1)-(N), databases 218(1)-(N), components 106(1)-(N) and servers 212(1)-(N) generally represent any type or form of computing device or system, such as computing system 900 in FIG. 9.

Similarly, server 212 generally represents a computing device or system, such as an application server or database server, configured to provide various database services and/or run certain software applications. Network 1030 generally represents any telecommunication or computer network including, for example, an intranet, a wide area network (WAN), a local area network (LAN), a personal area network (PAN), or the Internet. In one example, a start node 214 may include a start node module 1010. Similarly, a next node 220 may include a next node module 1020 as shown in FIG. 10.

As illustrated in FIG. 10, one or more servers 212(1)-(N) may be directly attached to each other as well as to a cluster 214 (which may include additional servers). Similarly, one or more databases 218(1)-(N) may be directly attached to server 212. Storage unit 210 generally represents any type or form of storage device or medium capable of storing data and/or other computer-readable instructions. In certain embodiments, storage unit 210 may represent network-attached storage (NAS) devices configured to communicate with servers 212(1)-(N) and cluster 214 using various protocols, such as Network File System (NFS), Server Message Block (SMB), or Common Internet File System (CIFS). Such storage devices can store backup images and/or backup catalogs, as described above.

Cluster 214 may also be connected to a storage area network (SAN) fabric 1040. SAN fabric 1040 generally represents any type or form of computer network or architecture capable of facilitating communication between multiple storage devices. SAN fabric 1040 may facilitate communication between servers 212(1) and 212(N) and multiple storage devices (e.g., primary storage device 932), and/or an storage unit 210. SAN fabric 1040 may also facilitate, via network 1030 and server 212, communication between the start node 214, next node 220, other nodes 206(1)-(N), components 106(1)-(N) and/or storage unit 210 in such a manner that components 106(1)-(N) and storage unit 210 appear as locally attached devices to the start node 214 and the next node 220. Start node 214, next node 220, other nodes 206(1)-(N), and components 106(1)-(N) generally represent any type or form of computing device, storage device or medium capable of storing data and/or other computer-readable instructions.

In certain embodiments, and with reference to computing system 900 of FIG. 9, a communication interface, such as communication interface 922 in FIG. 9, may be used to provide connectivity between the start node 214, the next node 220, each node 206(1)-(N) and network 450. Nodes 206(1)-(N) and components 106(1)-(N) may be able to access information on server 212 or cluster 214 using, for example, a web browser or other client software. Such software may allow nodes 206(1)-(N) and components 106(1)-(N) to access data hosted by server 212, cluster 214, storage unit 210, or databases 218(1)-(N). Although FIG. 10 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 212, cluster 214, storage unit 210, database 218, or any combination thereof. All or a portion of one or more of the embodiments disclosed herein may also be encoded as a computer program, stored in server 440, run by server 445, and distributed to client systems 410, 420, and 430 over network 450.

In some examples, all or a portion of one of the systems in FIGS. 2, 9, and 10 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a block-level deduplication module may transform the behavior of a deduplication system such that less than all of the data within a deduplication chunk needs to be transferred between deduplication clients and servers.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method in a computer system comprising:
receiving, at the computer system, a signature, wherein
the signature is represented by a sub-graph;
defining a start node, wherein
the start node is defined based on a condition of a component of a data center,
the condition is determined based on a relationship between the start node and a next node of the data center, and
the relationship between the start node and the next node is defined by an edge; and
determining, using a processor of the computer system, if the data center is over-provisioned or under-provisioned, wherein
the determining comprises matching the sub-graph and a portion of a main graph based on the condition and the signature, and
a failure to match the sub-graph and at least the portion of the main graph indicates that the data center is either over-provisioned or under-provisioned.

2. The method of claim 1, wherein
the sub-graph represents a pre-determined connectivity of the data center, and
the main graph represents an existing connectivity of the data center.

3. The method of claim 2, further comprising:
determining whether a node of the data center qualifies as the start node, wherein
the determining is based on the condition,
the signature corresponds to the pre-determined connectivity, and
the signature is represented visually by the sub-graph;
matching the signature and the condition; and
designating the node as the start node.

4. The method of claim 3, further comprising:
matching the signature to the sub-graph to determine whether the data center is over-provisioned or under-provisioned.

5. The method of claim 3, wherein
the conditional matching is begun at the start node, and
a first failure to meet the condition stops the conditional matching, wherein the first failure indicates that the data center is not over-provisioned or under-provisioned.

6. The method of claim 5, further comprising:
determining that the sub-graph and at least the portion of the main graph do not match after one or more adjustments are performed to the component upon the first failure; and
designating another node of the data center as the start node.

7. The method of claim 2, further comprising:
accessing a Service Level Agreement (SLA) to determine whether the data center is over-provisioned or under-provisioned upon the failure to conditionally match the sub-graph and at least the portion of the main graph.

8. A non-transitory computer readable storage medium comprising program instructions executable to:
receive, at a computer system, a signature, wherein
the signature is represented by a sub-graph;
define a start node, wherein
the start node is defined based on a condition of a component of a data center,
the condition is determined based on a relationship between the start node and a next node of the data center, and
the relationship between the start node and the next node is defined by an edge; and
determine, using a processor of the computer system, if the data center is over-provisioned or under-provisioned, wherein
the determining comprises matching the sub-graph and a portion of a main graph based on the condition and the signature, and
a failure to match the sub-graph and at least the portion of the main graph indicates that the data center is either over-provisioned or under-provisioned.

9. The non-transitory computer readable storage medium of claim 8, wherein
the sub-graph represents a pre-determined connectivity of the data center, and
the main graph represents an existing connectivity of the data center.

10. The non-transitory computer readable storage medium of claim 9, further comprising:
determining whether a node of the data center qualifies as the start node, wherein
the determining is based on the condition,
the signature corresponds to the pre-determined connectivity, and
the signature is represented visually by the sub-graph;
matching the signature and the condition;
designating the node as the start node; and
matching the signature to the sub-graph to determine whether the data center is over-provisioned or under-provisioned.

11. The non-transitory computer readable storage medium of claim 10, wherein
the conditional matching is begun at the start node, and
a first failure to meet the condition stops the conditional matching, wherein the first failure indicates that the data center is not over-provisioned or under-provisioned provisioned.

12. The non-transitory computer readable storage medium of claim 11, further comprising:
determining that the sub-graph and at least the portion of the main graph do not match after one or more adjustments are performed to the component upon the first failure; and
designating another node of the data center as the start node.

13. The non-transitory computer readable storage medium of claim 8, further comprising:
accessing a Service Level Agreement (SLA) to determine whether the data center is over-provisioned or under-provisioned upon the failure to conditionally match the sub-graph and at least the portion of the main graph.

14. A system comprising:
one or more processors; and
a memory coupled to the one or more processors, wherein the memory stores program instructions executable by the one or more processors to:
receive, at a computer system, a signature, wherein
the signature is represented by a sub-graph;
define a start node, wherein
the start node is defined based on a condition of a component of a data center,
the condition is determined based on a relationship between the start node and a next node of the data center, and
the relationship between the start node and the next node is defined by an edge; and
determine, using a processor of the computer system, if the data center is over-provisioned or under-provisioned, wherein
the determining comprises matching the sub-graph and a portion of a main graph based on the condition and the signature, and
a failure to match the sub-graph and at least the portion of the main graph indicates that the data center is either over-provisioned or under-provisioned.

15. The system of claim 14, wherein
the sub-graph represents a pre-determined connectivity of the data center, and
the main graph represents an existing connectivity of the data center.

16. The system of claim 15, further comprising:
determining whether a node of the data center qualifies as the start node, wherein
the determining is based on the condition,
the signature corresponds to the pre-determined connectivity, and
the signature is represented visually by the sub-graph;
matching the signature and the condition; and
designating the node as the start node.

17. The system of claim 16, further comprising:
matching the signature to the sub-graph to determine whether the data center is over-provisioned or under-provisioned.

18. The system of claim 17, wherein
the conditional matching is begun at the start node, and
a first failure to meet the condition stops the conditional matching, wherein the first failure indicates that the data center is not over-provisioned or under-provisioned.

19. The system of claim 18, further comprising:
determining that the sub-graph and at least the portion of the main graph do not match after one or more adjustments are performed to the component upon the first failure; and
designating another node of the data center as the start node.

20. The system of claim 14, further comprising:
accessing a Service Level Agreement (SLA) to determine whether the data center is over-provisioned or under-provisioned upon the failure to conditionally match the sub-graph and at least the portion of the main graph.

* * * * *